US010070358B2

(12) United States Patent
Lim et al.

(10) Patent No.: US 10,070,358 B2
(45) Date of Patent: Sep. 4, 2018

(54) LOAD BALANCING OF DATA FLOWS

(71) Applicant: Alcatel Lucent, Boulogne-Billancourt (FR)

(72) Inventors: Seau Sian Lim, Swindon (GB); Nicola Puddle, Swindon (GB); Sudeep Palat, Swindon (GB); Chandrika Worrall, Newbury (GB)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/909,835

(22) PCT Filed: Jul. 21, 2014

(86) PCT No.: PCT/EP2014/001992
§ 371 (c)(1),
(2) Date: Feb. 3, 2016

(87) PCT Pub. No.: WO2015/018490
PCT Pub. Date: Feb. 12, 2015

(65) Prior Publication Data
US 2016/0192265 A1   Jun. 30, 2016

(30) Foreign Application Priority Data

Aug. 9, 2013 (EP) .................................... 13360020

(51) Int. Cl.
*H04W 4/00* (2018.01)
*H04W 36/22* (2009.01)
(Continued)

(52) U.S. Cl.
CPC ........... *H04W 36/22* (2013.01); *H04W 28/08* (2013.01); *H04W 36/0016* (2013.01);
(Continued)

(58) Field of Classification Search
CPC ..................................................... H04W 36/22
See application file for complete search history.

(56) References Cited

U.S. PATENT DOCUMENTS

| 2012/0023189 A1* | 1/2012 | Giaretta | H04W 48/18 709/217 |
| 2013/0028172 A1* | 1/2013 | Lim | H04W 36/12 370/315 |

(Continued)

FOREIGN PATENT DOCUMENTS

| EP | 2603046 A1 | 6/2013 |
| JP | 2006505158 A | 2/2006 |

(Continued)

OTHER PUBLICATIONS

"3rd Generation Partnership Project; Technical Specification Group Radio Access Network; Study on WLAN/3GPP Radio Interworking (Release 12)", 3GPP Draft; 37834-030, 3rd Generation Partnership Project (3GPP), Mobile Competence Centre; 650, Route Des Lucioles; F-06921 Sophia-Antipolis Cedex; France, May 2013, pp. 14.

(Continued)

*Primary Examiner* — Gerald A Smarth
(74) *Attorney, Agent, or Firm* — Harness, Dickey & Pierce, P.L.C.

(57) ABSTRACT

A method for performing load balancing of data flows from a user equipment (UE) between a first radio access network and a second radio access network, wherein the UE is attached to the said first radio access network, the method comprising providing preference data from the first radio access network to the UE representing radio related parameters, determining the presence of an access network discovery and selection function (ANDSF) of the UE, evaluating, at the UE, including using ANDSF if present, the preference data to determine if a data flow can be offloaded (Continued)

to the second radio access network, and on the basis of the evaluation, offloading a data flow of the UE from the first radio access network.

14 Claims, 7 Drawing Sheets

(51) Int. Cl.
| | | |
|---|---|---|
| *H04W 28/08* | (2009.01) | |
| *H04W 48/18* | (2009.01) | |
| *H04W 36/14* | (2009.01) | |
| *H04W 36/28* | (2009.01) | |
| *H04W 36/00* | (2009.01) | |
| *H04W 36/30* | (2009.01) | |
| *H04W 48/16* | (2009.01) | |
| *H04W 88/06* | (2009.01) | |
| *H04W 48/14* | (2009.01) | |

(52) U.S. Cl.
CPC ........... *H04W 36/14* (2013.01); *H04W 36/28* (2013.01); *H04W 36/30* (2013.01); *H04W 48/16* (2013.01); *H04W 48/18* (2013.01); *H04W 48/14* (2013.01); *H04W 88/06* (2013.01)

(56) References Cited

U.S. PATENT DOCUMENTS

| | | | | |
|---|---|---|---|---|
| 2013/0107863 | A1* | 5/2013 | Faccin | H04W 36/0022 370/331 |
| 2014/0066059 | A1* | 3/2014 | Patil | H04W 48/16 455/434 |
| 2014/0079022 | A1* | 3/2014 | Wang | H04W 36/22 370/331 |
| 2014/0086172 | A1* | 3/2014 | Kwon | H04B 7/0689 370/329 |

FOREIGN PATENT DOCUMENTS

| | | |
|---|---|---|
| JP | 2013530640 A | 7/2013 |
| KR | 20120001343 A | 1/2012 |
| WO | WO-2010/037422 A1 | 4/2010 |
| WO | WO-2014/112595 A1 | 7/2014 |

OTHER PUBLICATIONS

"Considerations of Rules/policies based solutions," R2-132010, 3GPP TSG-RAN WG2#82, Alcatel-Lucent, Alcatel-Lucent Shanghai Bell, Fukuoka, Japan, May 20-2, 2013, pp. 1-3.

"3rd Generation Partnership Project; Technical Specification Group Radio Access Network; Study on WLAN/3GPP Radio Interworking (Release 12)", 3GPP Draft; 37834-030, $3^{rd}$ Generation Partnership Project (3GPP), Mobile Competence Centre; 650, Route Des Lucioles; F-06921 Sophia-Antipolis Cedex; France, Jun. 2, 2013, pp. 14.

Alcatel-Lucent et al: "Solution supporting deployment with and without ANDSF", 3GPP Draft; R2-133490 WIFI_vol. 4, $3^{rd}$ Generation Partnership Project (3GPP), Mobile Competence Centre; 650, Route Des Lucioles; F-06921 Sophia-Antipolis Cedex; France, vol. RAN WG3, no. Ljubljana, Slovenia; Sep. 27, 2013, 3 pp.

International Search Report PCT/ISA/210 for International Application No. PCT/EP2014/001992 dated Aug. 19, 2014.

Written Opinion of the International Searching Authority PCT/ISA/237 for International Application No. PCT/EP2014/001992 dated Aug. 19, 2014.

"Technical Specification Group Radio Access Network; Study on WLAN/3GPP Radio Interworking (Release 12)," 3GPP TR 37.834, V0.3.0 (2013).

* cited by examiner

LOAD BALANCING OF DATA FLOWS

CROSS-REFERENCE TO RELATED APPLICATIONS

This is a National Phase of PCT Patent Application No. PCT/EP2014/001992 filed on Jul. 21, 2014, and claims priority to, European Application No. 13360020.5, filed Aug. 9, 2013, the contents of each of which are hereby incorporated by reference in their entirety.

TECHNICAL FIELD

The disclosed embodiments relate generally to wireless network communication, will, more particularly, to multi-radio interworking in heterogeneous wireless communication networks.

BACKGROUND

User communication devices, such as laptops, tablets, smart phones, also known as user equipment (UE) typically support multiple wireless technologies such as WIFI and Cellular Wireless Technologies such as LTE, CDMA and so on. Standard protocols, such as 3GPP, 3GPP2 and so on define control protocols by which the user equipment can select a component access technology.

Wireless LAN technologies, such as WIFI and WiMAX, are becoming increasingly available as WIFI. These services may be offered by the same operator as the wireless cell operator or by a different operator. Also, cell operators are deploying micro and femto cells in certain locations to increase the capacity and coverage in dense locations. Network selection in the majority of the mobile wireless devices is based on Received Signal Strength or based on the configuration of the best network in the device, and by type of service (voice or data), that the user initiates. For example, on a device that has connectivity to both a radio access network and WIFI networks, when the user initiates a circuit switched (CS) service, such as a voice call or SMS for example, the device uses the RAN. However, when the user initiates packet switched (PS) services, the device uses WLAN. If the device is currently not associated with a WIFI access point (AP), and if the WIFI radio is enabled, the device attempts to connect to the highest priority WLAN/SSID that it successfully connected to previously.

3GPP standards define Access Network Discovery and Selection (ANDSF) methods by which a mobile device identifies which access network to connect to (Network Selection and inter System Mobility Policy), or which network to route specific IP flows to (Inter System Routing Policy). This framework uses a client application (ANDSF Client) and server (ANDSF Server) in the operator's core network. However, there is a need for a method and system to enable enhanced operator control for WLAN interworking, and to enable WLAN to be included in an operator's cellular Radio Resource Management.

SUMMARY

According to an example, there is provided a method for performing load balancing of data flows from a user equipment (UE) between a first radio access network and a second radio access network, wherein the UE is attached to the said first radio access network, the method comprising providing preference data from the first radio access network to the UE representing radio related parameters, determining the presence of an access network discovery and selection function (ANDSF) of the UE, evaluating, at the UE, including using ANDSF if present, the preference data to determine if a data flow can be offloaded to the second radio access network, and on the basis of the evaluation, offloading a data flow of the UE from the first radio access network. The preference data can be evaluated at the radio side of the UE (UE access stratum). The preference data can be evaluated at the non-radio side of the UE (UE non-access stratum). The preference data can be provided as an input to an ANDSF module of the UE. The preference data can be provided as an input to a radio signal strength evaluation module for determining a signal strength of a radio communication link between the UE and the first radio access network. A threshold signal strength value can be provided, and offloading a data flow of the UE can be determined on the basis of signal strength compared to the threshold signal strength. The preference data can be forwarded to the UE non-radio side on the basis of a measurement of radio parameters such as signal strength and/or WIFI load. The preference data can be forwarded to the UE non-radio side from the UE radio side without evaluation at the radio side of the UE. A determination as to whether to offload a data flow of the UE from the first radio access network can be made at the UE non-radio side. A determination as to whether to offload a data flow of the UE from the first radio access network can be made at the UE radio side.

According to an example, there is provided a radio telecommunication system comprising:

a first radio access network, a second radio access network, a HE attached to the said first radio access network, the system operable to provide preference data from the first radio access network to the UE representing radio related parameters, determine the presence of an access network discovery and selection function (ANDSF) of the UE, evaluate, at the including using ANDSF if present, the preference data to determine if a data flow can be offloaded to the second radio access network, and on the basis of the evaluation, offload a data flow of the UE from the first radio access network. The UE can be operable to evaluate the preference data at the radio side (UE access stratum) thereof. The UE can be operable to evaluate the preference data at the non-radio side (UE non-access stratum) thereof. According to an example, there is provided a UE operable in accordance with the method as provided above.

According to an example, there is provided computer program product, comprising a computer usable medium having computer readable program code embodied therein, said computer readable program code adapted to be executed to implement a method, in a radio communication system, for performing load balancing of data flows from a user equipment (UE) between a first radio access network and a second radio access network, wherein the UE is attached to the said first radio access network, the method as provided above.

BRIEF DESCRIPTION OF THE DRAWINGS

Embodiments will now be described, by way of example only, with reference to the accompanying drawings, in which.

DETAILED DESCRIPTION

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in Mat they have a single referent, however the use of the singular form in the present document should not preclude the presence of more than one referent. In other words, elements referred to in the singular can number one or more, unless the context clearly indicates otherwise. It will be anther understood that the terms "comprises," "comprising," "includes," "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

In the alternative solution (i.e. solution independent of ANDSF), the radio side of the UE (UE access stratum) performs the load balancing between 3GPP and WLAN. Such load balancing is normally bearer based (i.e. may contain multiple IP flows within it) which may not be what the operator wants (e.g. some special operator IP services should be kept in 3GPP in the non-seamless offload situation) and also it may not align with the decision of ANDSF (if present) resulting in possible ping pong.

In an example, preference data representing radio access network (RAN) preferences is provided to the ANDSF (if present) or to the non-radio side of the UE (UE non-access stratum (NAS)) to mate the final evaluation on whether to apply the RAN decision/preference of the UE or an IP flow of the UE. The ANDSF includes rules to decide whether a RAN decision/preference should be taken for the UE or an IP flow of the UE. This rule can be whether to override or not or take into consideration further e.g. 3GPP signal strength, WiFi load and roaming/no-roaming case. An operator can decide for each UE or IP flow whether the RAN preference data can override the ANDSF preference. In the case ANDSF is not present, the RAN preference data can be used directly by the NAS to make final decision taking into consideration user preference, local settings etc.

The RAN preference data sent over the 3GPP RAN either via broadcast or dedicated signalling is arranged in priority order (e.g. 3GPP, WLAN SSID#5, WLAN SSID#2 where 3GPP is highest priority while WLAN SSID#5 is higher priority than WLAN SSID#2 but lower priority than 3GPP). The priority order can be based on network operator preference, load of 3GPP etc.

Figure 1:
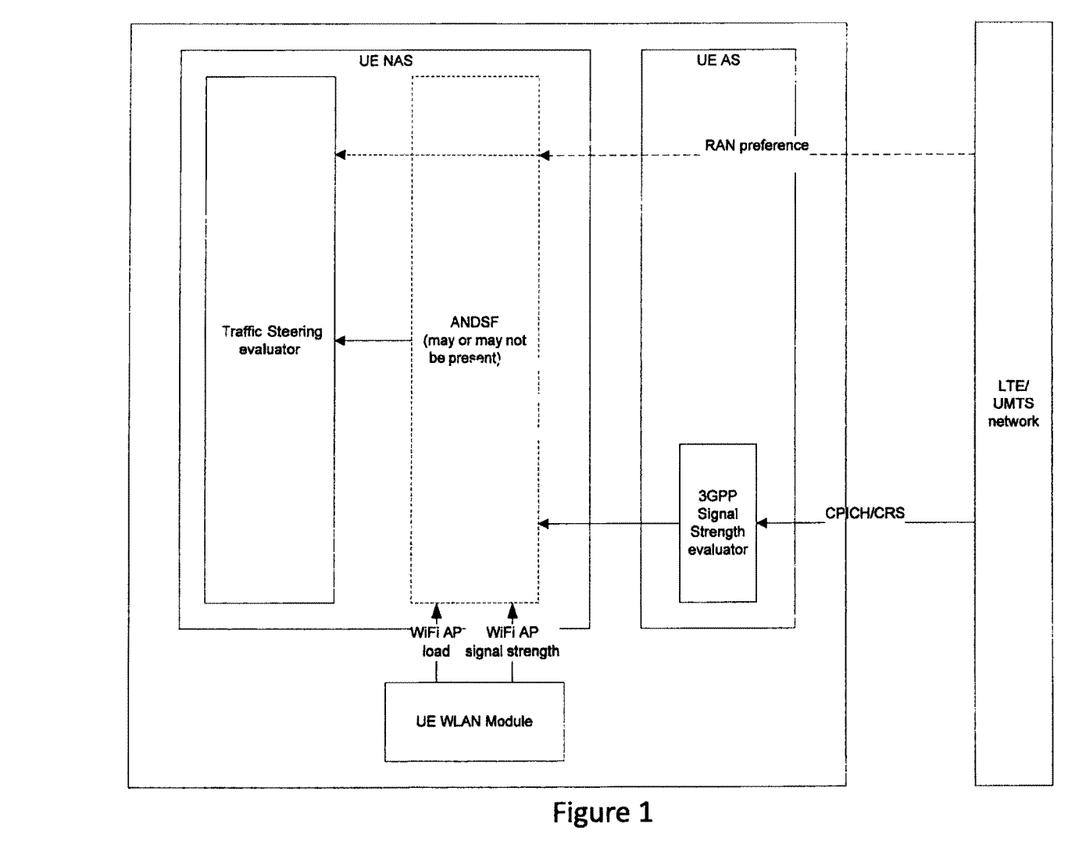
FIG. 1 is a schematic representation of an information flow according to an example.

There are 2 methods to achieve the above:

FIG. 1 is a schematic representation of an information flow in which the RAN preference data is provided as an input to the ANDSF module if present or a direct input to the Traffic Steering evaluator module according to an example. The RAN preference data is further evaluated in the ANDSF module whether to be considered for an IP flow/UE.

In order to prevent conflict with ANDSF (if available), the RAN preference data provides a new routing rules to the active ANDSF policies if they are present (e.g. the policies are provided by the network or statically provisioned by the operator). This also allows the RAN preference data to be used for IP flow traffic sleeting (e.g. for each IP flow or each PDN connection, the ANDSF policy can include within the policy that governed the IP flow or UE whether it will take the RAN preference data into consideration). In the case ANDSF policies are not present, the RAN preference data will be used directly. As the RAN preference data is done on the UE NAS, IP flow traffic steering is still possible (e.g. RAN preference data will govern those IP flows that do not have restrictions by user and application preferences).

The RAN preference data is decided based on the cell/backhaul load and UE specific factors (e.g. heavy user). In ANDSF policy, RAN preference data can provide (for a UE or IP flow) the access technology priority (e.g. 3GPP is higher priority than WLAN) and for WLAN it can also contain a list of WLAN IDs (e.g. SSID, HESSID etc.) that are high priority or lower priority than 3GPP (e.g. the list can have this priority order WLAN SSID#1, 3GPP, WLAN SSID#2).

In the case ANDSF is present, the criteria to take into consideration RAN preference datacan include:
  Always override the ANDSF active traffic steering policies (i.e. ISRP and ISMP) for a IP flow
  Consider also 3GPP/Win signal strength and/or WLAN load when deciding whether to override the ANDSF preference with the RAN preference data for an IP flow.

Figure 2:
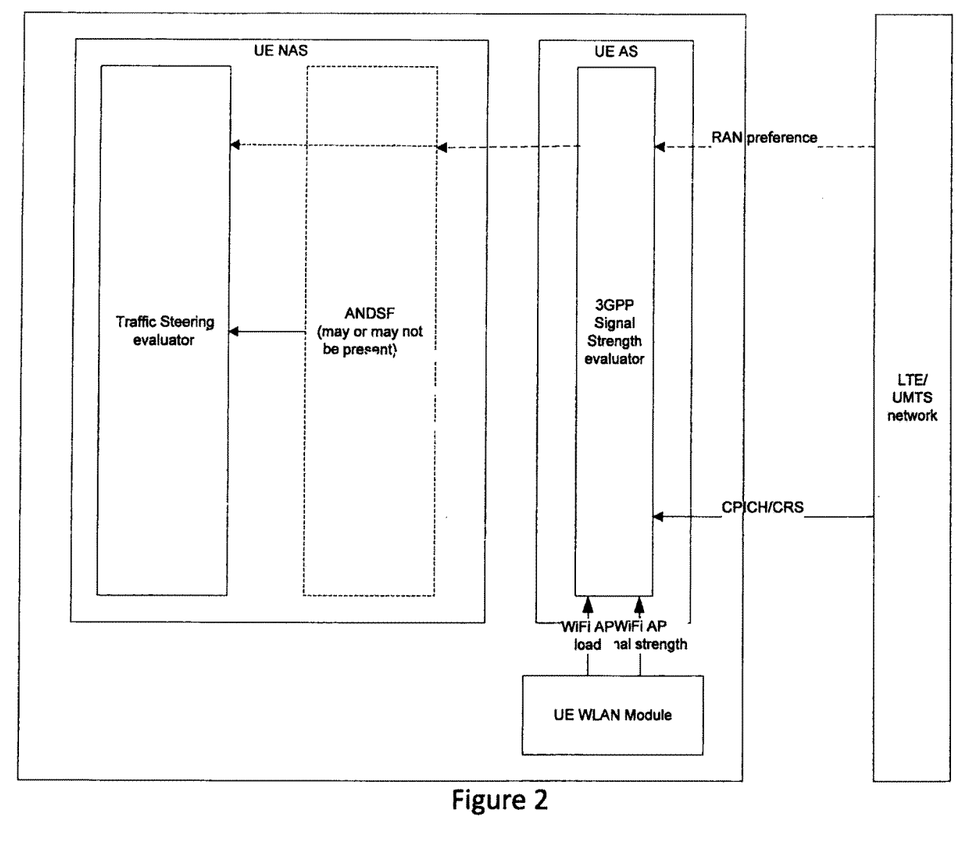
FIG. 2 is a schematic representation of another information flow according to an example.

FIG. 2 is a schematic representation of an information flow in which the RAN preference data is provided as an input to the ANDSF module if present or a direct input to the Traffic Steering evaluator module according to an example. The RAN preference data is further evaluated in the UE AS whether the UE should take into consideration and the priority order on the WLAN SSIDs provided in the RAN preference data.

Again to prevent conflict with ANDSF (if available), the RAN preference data is provided as a set of new routing rules to the active ANDSF policies. If ANDSF module is not present, it will be used directly by the Traffic Steering evaluator module.

Again the RAN preference data is determined based on the cell/backhaul load and UE specific factors (e.g. heavy user) at the network. At the UE, the RAN preference data is further evaluated at the UE AS based on the 3GPP signal strength. Specific rules can be specified indicating whether to consider the RAN preference data (e.g. if 3GPP signal strength>threshold high for RAN preference data, keep UE in 3GPP or if 3GPP signal strength<threshold_low for RAN preference data, switch UE to WiFi for example). As mentioned above the RAN preference data can contain a list of WLAN IDs which can be ordered based on the WiFi information from the UE WLAN Module. The resultant RAN preference data is then provided to ANDSF (if available) or to the traffic steering evaluator directly.

With reference to FIG. 1, the RAN preference data is provided either as an input to the ANDSF module or directly to the Traffic Steering Evaluator module. In the presence of ANDSF module, the ANDSF policies may either decide whether the preference should be applied or not for an IP flow or further evaluate the preference based on WiFi load and 3GPP/WiFi signal strength whether it should be applied to an IP flow.

Examples of RAN preference data include:
a) RAT preference (i.e. either 3GPP or WLAN)
b) Network preference (i.e. which 3GPP cells and WLAN SSIDs), e.g. {3GPP CID#1, 3GPP CID#5, WLAN SSID#3, WLAN SSID#7}

Figure 3A:
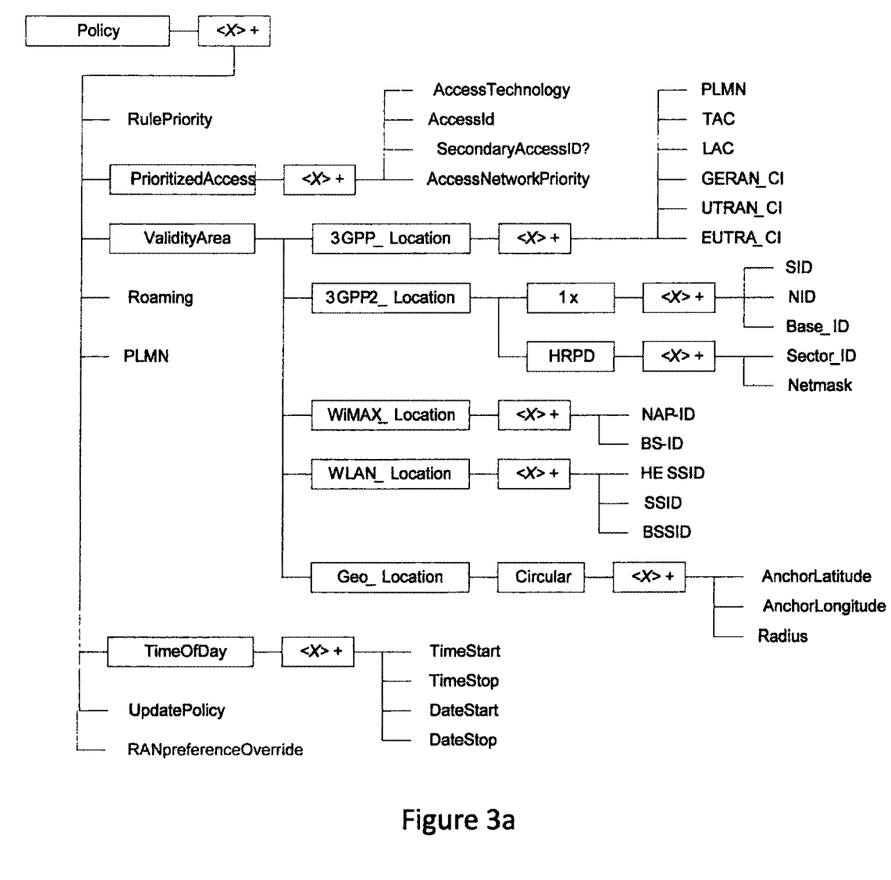
FIG. 3*a* is a schematic representation of a situation when ANDSF policies are updated to decide whether the RAN preference data should be applied or not according to an example.
Figure 3B:
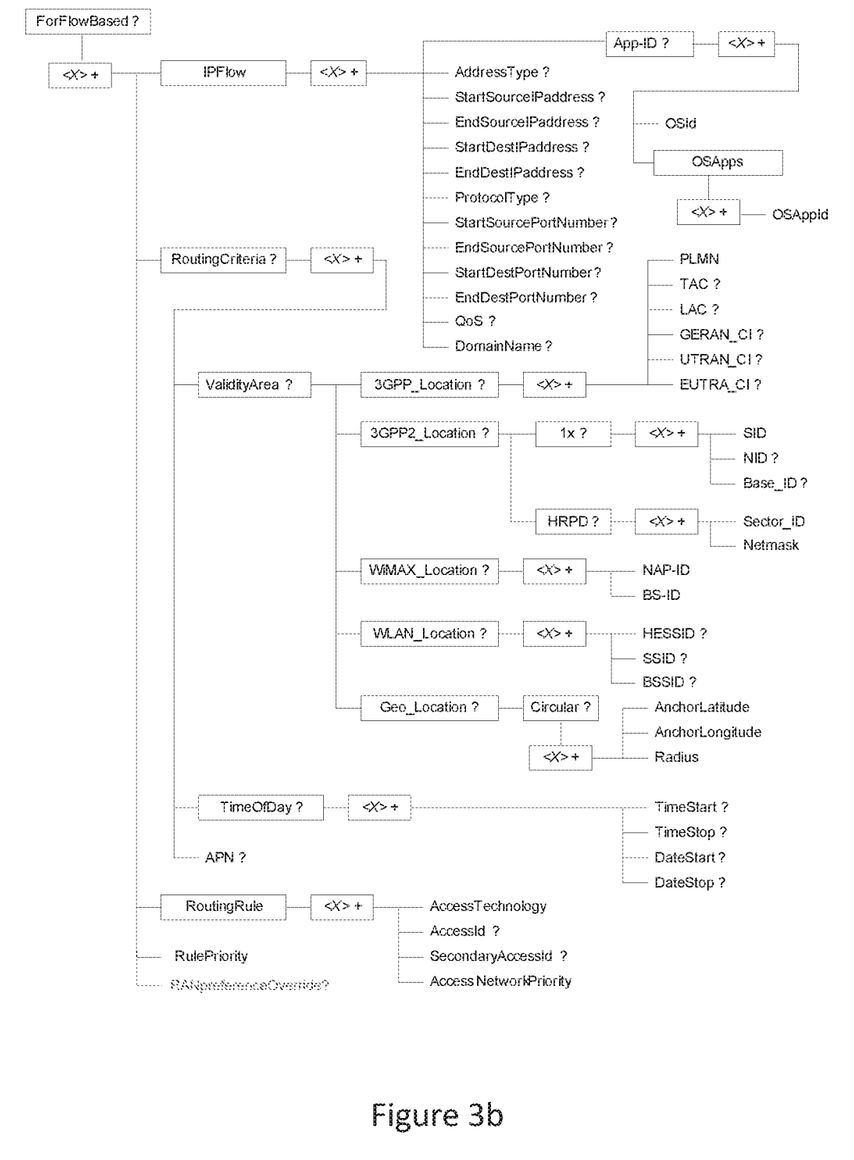
FIG. 3*b* is a further schematic representation of a situation when ANDSF policies are updated to decide whether the RAN preference data should be applied or not according to an example.

The ANDSF can interact with the RAN preference data in a number of ways. FIGS. 3a and 3b are examples for the situation when ANDSF policies are updated to decide whether the RAN preference data should be applied or not. More specifically, for ISMP: Whether the RAN preference data will override the Prioritised Access of a rule in the policy (FIG. 3a), and for ISRP: Whether the RAN preference data will override the RoutingRule of a rule related to a IP flow in the policy (FIG. 3b).

Figure 4A:
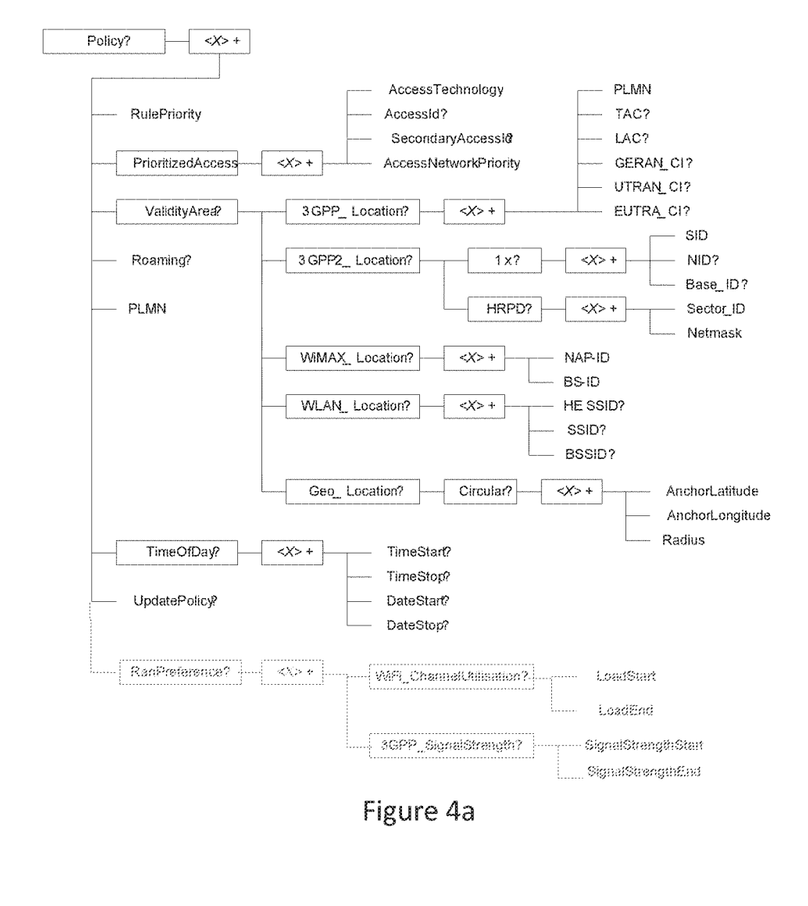
FIG. 4*a* is a schematic representation of a situation when ANDSF policies are further evaluated using WiFi load and 3GPP signal strength according to an example.
Figure 4B:
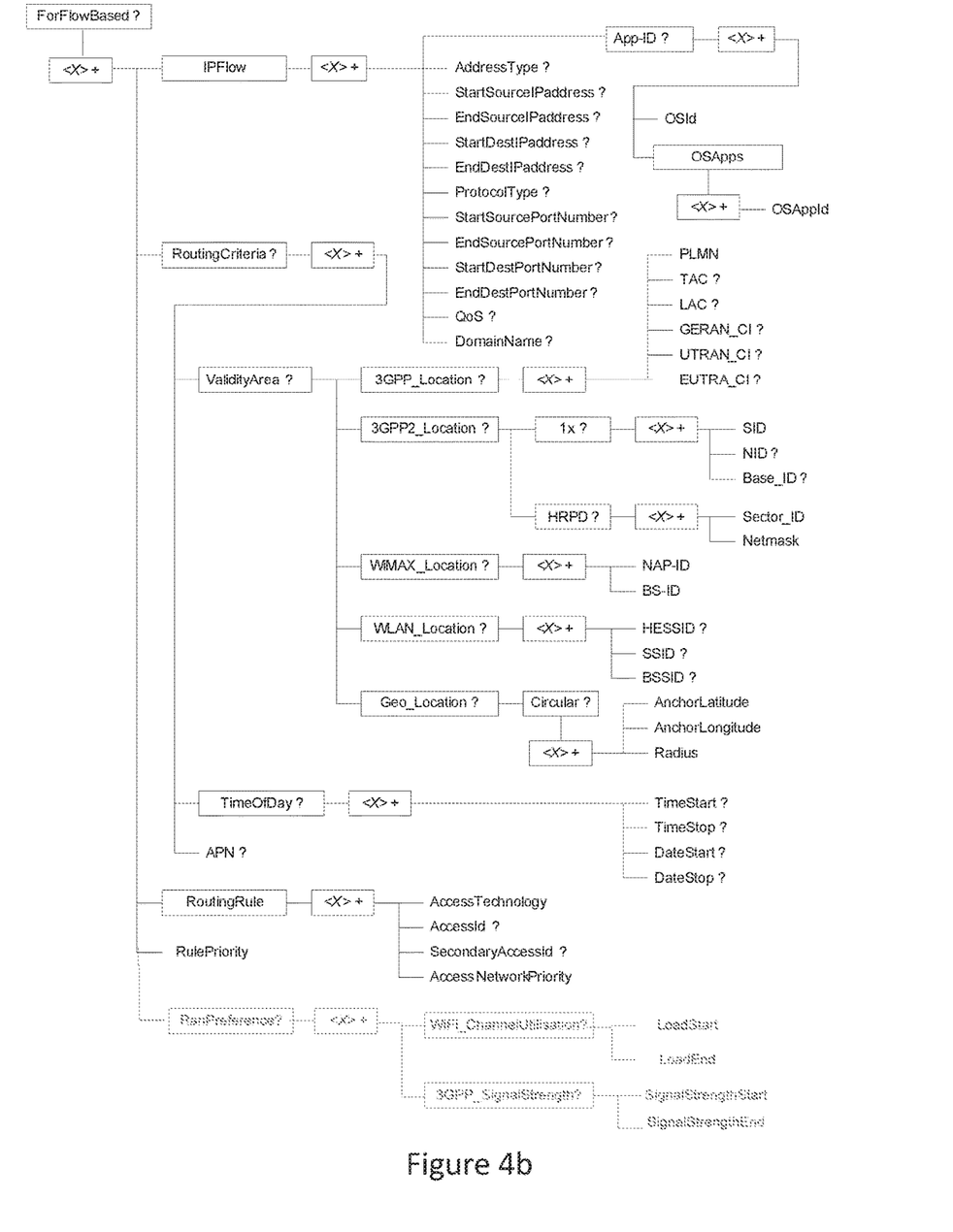
FIG. 4*b* is a further schematic representation of a situation when ANDSF policies are further evaluated using WiFi load mid 3GPP signal strength according to an example.

FIGS. 4a and 4b are examples for the situation when ANDSF policies are further evaluated using WiFi load and 3GPP signal strength. More specifically, for ISMP: ANDSF is extended to include RAN parameters such as WiFi load and 3GPP signal strength to decide whether to apply RAN preference data (FIG. 4a) instead of the Prioritised Access of a rule in the policy. For ISRP: ANDSF is extended to include RAN parameters such as WiFi load and 3GPP signal strength to decide whether to apply RAN preference data (FIG. 4b) instead of the RoutingRule of a rule related to a IP flow in the policy In the case ANDSF is present, the RAN preference data will be an input parameter to the ANDSF function. Based on the user preference, application preference and the ANDSF output, the UE NAS can decide how the UE or a particular IP flow of the UE should move between 3GPP and WLAN.

Referring to FIG. 2, the RAN preference data is first evaluated at the UE AS and the outcome is provided as an input to the ANDSF module or directly to the Traffic Steering Evaluator module. In the presence of ANDSF, the ANDSF policies may decide whether the preference should be applied or not for an IP flow The main difference between the methods as described with reference to FIGS. 1 and 2 is that for the case where consideration of radio parameters is done at the UE AS rather than ANDSF, the UE AS can either (A) determine whether to forward the RAN preference data to UE NAS based on WiFi load and 3GPP/WiFi signal strength and so on, or (B) modify the RAN preference data based on WiFi load and 3GPP/WiFi signal strength before forwarding to UE NAS.

In the first case, as an example:
A 3GPP signal strength and WLAN load is used to determine whether a RAN preference data is to be forwarded to UE NAS. For example, if the RAN preference data is to use WLAN, UE will only forward the RAN preference data to UE NAS if the measured radio parameters such as 3GPP signal strength and WLAN load are low. If the RAN preference data is to use 3GPP, UE will only forward the RAN preference data to UE NAS if the measured 3GPP signal strength and WLAN load are high.

In the second case, as an example:
RAN preference data is further modified at the UE AS based on radio parameter measurements 3GPP signal strength and WLAN load. For example, the 3GPP signal strength will enable the decision as to whether to forward the RAN preference data to UE NAS while the WLAN load/signal strength will be used to reorder WLAN SSIDs within the preference data.

Therefore, according to an example, there are two processes that can ensue, either:
1. UE AS evaluates whether to forward the preference data to UE NAS based on signal strength and WiFi load
2. If the UE NAS receives the preference data from UE AS
   a. If ANDSF is present, the preference data is an input to the ANDSF and the ANDSF evaluates whether to use the preference data or the ANDSF preference (e.g. just a flag to indicate whether the preference data should override the ANDSF preference) before the UE NAS makes the final decision based on the ANDSF outcome
   b. If ANDSF is not present, the NAS will use the preference data to make final decision.
Or:
1. UE AS just forward the preference data to UE NAS
2. If the UE NAS receives the preference data from UE AS
   a. If ANDSF is present, the preference data is an input to the ANDSF and the ANDSF evaluates whether to use the preference data or the ANDSF preference based, on signal strength and WiFi load before the UE NAS makes the final decision based on the ANDSF outcome
   b. If ANDSF is not present, the UE NAS will use the preference data to make final decision.

Both methods will use an ANDSF policy if such a module is present. In the case that the UE AS has already performed some evaluation, ANDSF (if present) will determine whether to accept the preference data. Alternatively, ANDSF does all the evaluation.

Figure 5:
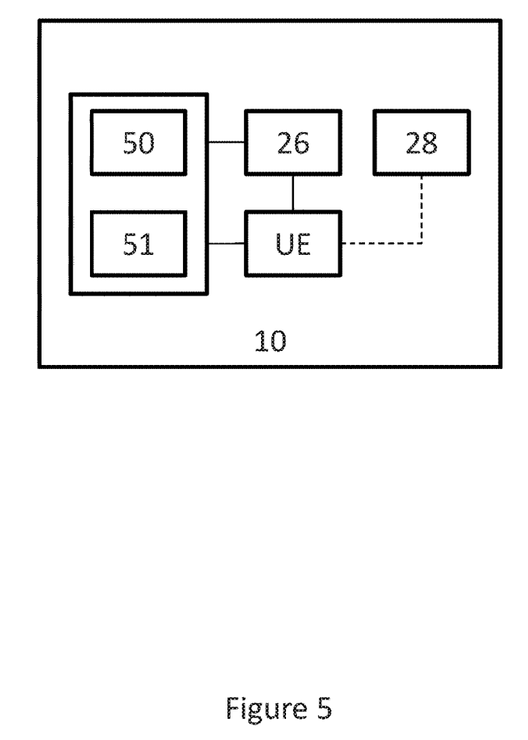
FIG. 5 is a schematic representation of a system according to an example.

FIG. 5 is a schematic representation of a system according to an example. A radio telecommunication system (10) comprises a first radio access network (26) and a second radio access network (28). ADE (21) is attached to the first radio access network (26) and UE (21) can send and receive data to and from the network (26). The system (10) is operable to provide preference data (50) from the first radio access network (26) to the UE representing radio related parameters (51). The system (10) can determine the presence of an access network discovery and selection function (ANDSF) of the UE (21), and evaluate, at the UE, including using ANDSF if present, the preference data (50) in order to determine if a data flow can be offloaded to the second radio access network (28). On the basis of the evaluation, the system can offload a data flow of the UE from the first radio access network (26). The data flow can be offloaded to the second radio access network.

The present inventions can be embodied in other specific apparatus and/or methods. The described embodiments are to be considered in all respects as illustrative and not restrictive. In particular, the scope of the invention is indicated by the appended claims rather than by the description and figures herein. All changes that come within the meaning and range of equivalency of the claims are to be embraced within their scope.

The invention claimed is:

1. A method for performing load balancing of data flows from a user equipment (UE) between a first radio access network and a second radio access network, the first and second radio access network being heterogeneous, wherein the UE is attached to the said first radio access network, the method comprising:
receiving preference data from the first radio access network at the UE, the preference data representing radio related parameters, the preference data being provided as an input to a radio signal strength of a radio communication link between the UE and the first radio access network;
determining the presence of an access network discovery and selection function (ANDSF) of the UE;
evaluating, at the UE, including using ANDSF if present, the preference data to determine if a data flow can be offloaded to the second radio access network, a non-access stratum (NAS) of the UE being used to make a final evaluation as to whether to apply the preference data; and
based on the evaluation, offloading a data flow of the UE from the first radio access network.

2. A method as claimed in claim 1, wherein the preference data is evaluated at a radio side of the UE, the radio side of the UE being a UE access stratum.

3. A method as claimed in claim 2, wherein the preference data is provided as an input to an ANDSF module of the UE, if present.

4. A method as claimed in claim 3, wherein the preference data is evaluated at an ANDSF module of the UE, if present.

5. A method as claimed in claim 2, wherein the preference data is forwarded to a UE non-radio side based on a measurement of radio parameters such as signal strength and/or WiFi load.

6. A method as claimed in claim 5, wherein a determination as to whether to offload a data flow of the UE from the first radio access network is made at the UE non-radio side.

7. A method as claimed in claim 1, wherein the preference data is evaluated at a non-radio side of the UE, the non-radio side of the UE being a UE non-access stratum.

8. A method as claimed in claim 7, wherein the preference data is forwarded to the UE non-radio side from a UE radio side without evaluation at the radio side of the UE.

9. A method as claimed in claim 1, further including providing a threshold signal strength value, and wherein the offloading a data flow of the UE is determined based on signal strength compared to the threshold signal strength.

10. A UE operable in accordance with the method as claimed in claim 1.

11. A non-transitory computer-readable medium including computer executable instructions that, when executed by one or more processors cause the one or more processors to perform the method of claim 1.

12. A radio telecommunication system comprising:
a first radio access network;
a second radio access network, the first radio access network and second radio access network being heterogeneous; and
a user equipment (UE) attached to the said first radio access network,
wherein the system is operable to
receive preference data from the first radio access network at the UE, the preference data representing radio related parameters, the preference data being provided as input to a radio signal strength evaluation module of the UE for determining a wireless local area network (WLAN) load and a signal strength of a radio communication link between the UE and the first radio access network,
determine the presence of an access network discovery and selection function (ANDSF) of the UE,
evaluate, at the UE, including using ANDSF if present, the preference data to determine if a data flow can be offloaded to the second radio access network, a non-access stratum (NAS) of the UE being used to make a final evaluation as to whether to apply the preference data, and
based on the evaluation, offload a data flow of the UE from the first radio access network.

13. A system as claimed in claim 12, wherein the UE is operable to evaluate the preference data at a radio side of the UE, the radio side of the UE being a ROPE access stratum.

14. A system as claimed in claim 12, wherein the UE is operable to evaluate the preference data at a non-radio side of the UE, the non-radio side of the UE being a UE non-access stratum.

* * * * *